(12) United States Patent
Watfa et al.

(10) Patent No.: US 9,483,770 B2
(45) Date of Patent: Nov. 1, 2016

(54) SOCIAL AGGREGATION COMMUNICATIONS

(75) Inventors: Allie K. Watfa, Urbana, IL (US); Dale Nussel, Mahomet, IL (US); Jonathan Kilroy, Champaign, IL (US)

(73) Assignee: Yahoo! Inc., Sunnyvale, CA (US)

( * ) Notice: Subject to any disclaimer, the term of this patent is extended or adjusted under 35 U.S.C. 154(b) by 1475 days.

(21) Appl. No.: 12/870,690

(22) Filed: Aug. 27, 2010

(65) Prior Publication Data

US 2012/0054008 A1  Mar. 1, 2012

(51) Int. Cl.
G06Q 30/02 (2012.01)

(52) U.S. Cl.
CPC .......... *G06Q 30/02* (2013.01); *G06Q 30/0252* (2013.01); *G06Q 30/0261* (2013.01)

(58) Field of Classification Search
CPC .................. G06Q 30/0252; G06Q 30/061
USPC .............................. 705/14.5, 14.58
See application file for complete search history.

(56) References Cited

U.S. PATENT DOCUMENTS

| 6,922,672 | B1 | 7/2005 | Hailpern et al. |
| 7,092,821 | B2 | 8/2006 | Mizrahi et al. |
| 8,032,413 | B2 | 10/2011 | Carlson |
| 2008/0249836 | A1 | 10/2008 | Angell et al. |
| 2009/0012841 | A1 | 1/2009 | Saft et al. |

OTHER PUBLICATIONS

U.S. Appl. No. 12/877,844, filed Sep. 9, 2010, Watfa et al.
International Search Report and Written Opinion for App. PCT/US2011/043087, dated Jan. 19, 2012, 11pp.
U.S. Appl. No. 13/016,609, filed Jan. 28, 2011, Chen et al.
U.S. Appl. No. 13/833,550, Jul. 9, 2010, Watfa et al.
Office Action issued in Taiwanese Patent Application No. 100124008 dated Feb. 24, 2014.

*Primary Examiner* — Namrata Boveja
*Assistant Examiner* — Allan Woodworth, II
(74) *Attorney, Agent, or Firm* — Mauriel Kapouytian Woods LLP; Lana Akopyan; James Woods (57) ABSTRACT

The present invention provides techniques for utilizing opportunities presented by events and social gatherings, such as online advertisement targeting and communications-related opportunities. Techniques are provided in which information is obtained that provides an indication that a set of users, including mobile electronic device users, are in a specified area, and indicating that at least some of the set of users are at a particular event or gathering. A virtual user grouping may be formed, and communications between users of the grouping is facilitated, based at least in part on the particular event or gathering.

16 Claims, 11 Drawing Sheets

SOCIAL AGGREGATION COMMUNICATIONS

BACKGROUND

People often come together for various events and social gatherings, for example. These events or gatherings may relate to a common interest among people in the group, and in fact the events or gatherings themselves represent a shared experience common to the group. Online service-providers and advertisers generally seek to achieve goals in connection with individuals, such as to elicit specific responses or favorable perceptions of a brand, for example. Furthermore, existing techniques are highly developed in terms of, for example, targeting an individual based on the individual's demographics, characteristics, interests, past behavior, etc. Yet existing techniques to not optimally recognize, capture, utilize, or leverage opportunities presented by events and social gatherings, for example.

There is a need for techniques for utilizing opportunities presented by events and gatherings.

SUMMARY

Some embodiments of the invention provide systems and methods for utilizing opportunities presented by events and gatherings, such as online advertisement targeting and communications-related opportunities. In some embodiments, techniques are provided in which information is obtained that provides an indication that a set of users, including mobile electronic device users, are in a specified area, and indicating that at least some of the set of users are at a particular event or gathering. In some embodiments, a virtual user grouping may be formed, and users in the group are targeted, such as with online advertisements, based at least in part on the particular event or gathering.

In some embodiments, a virtual user grouping may be formed based in part on a particular event or gathering with which the users are associated, and communications between users in the grouping may be facilitated. Furthermore, in some embodiments, social substructures, which may be associated with the virtual grouping, may be identified, and communications between users of a particular social substructure may be facilitated based in part on the particular social substructure, or based in part on roles of users within the social substructure.

While the invention is described with reference to the above drawings, the drawings are intended to be illustrative, and the invention contemplates other embodiments within the spirit of the invention.

DETAILED DESCRIPTION

Figure 1:
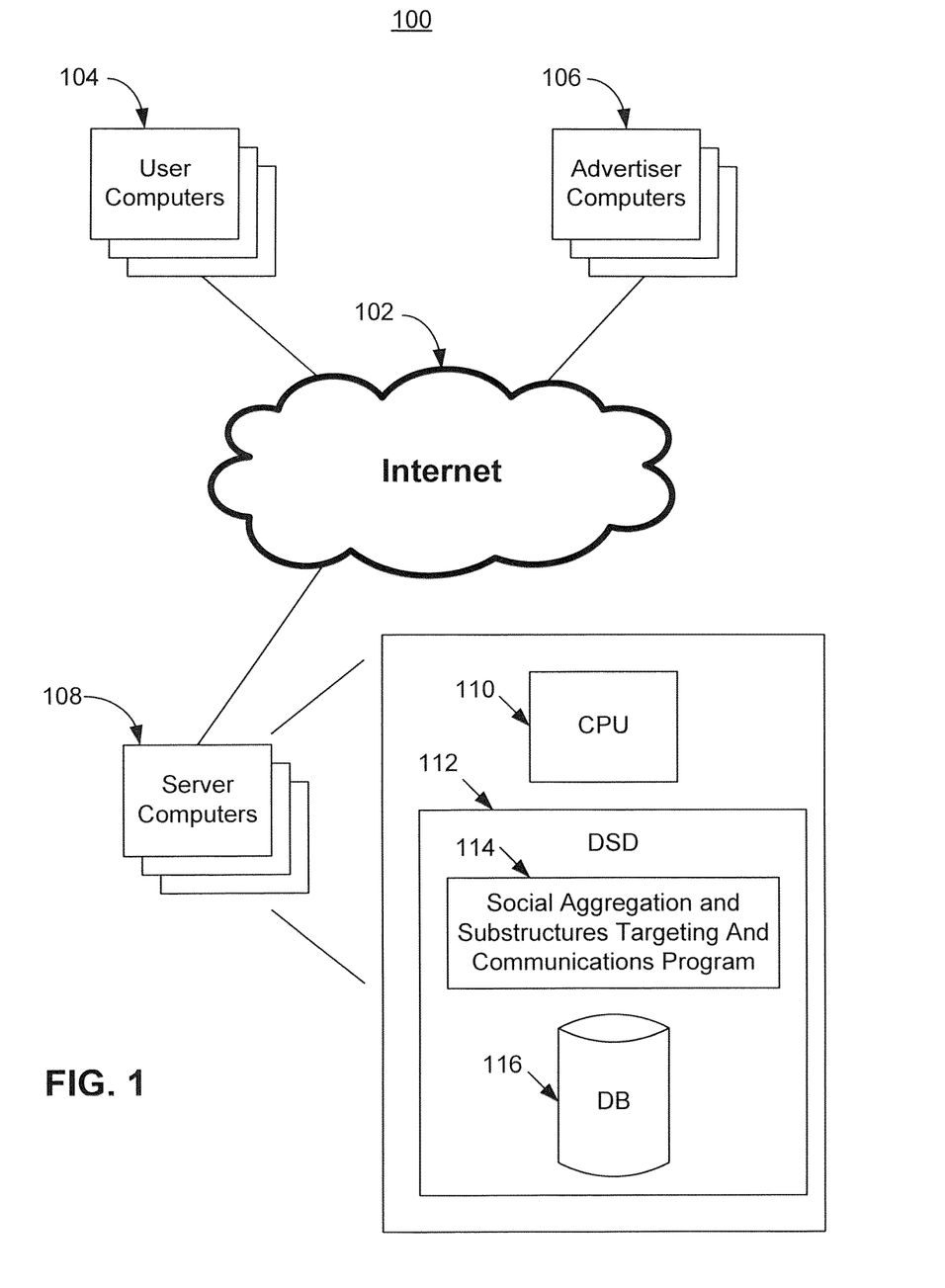
FIG. 1 is a distributed computer system according to one embodiment of the invention.

FIG. 1 is a distributed computer system 100 according to one embodiment of the invention. The system 100 includes user computers 104, advertiser computers 106 and server computers 108, all coupled or able to be coupled to the Internet 102. Although the Internet 102 is depicted, the invention contemplates other embodiments in which the Internet is not included, as well as embodiments in which other networks are included in addition to the Internet, including one more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, algorithms, programs and tools. Depicted computers may also include a hard drive, monitor, keyboard, pointing or selecting device, etc. The computers may operate using an operating system such as Windows by Microsoft, etc. Each computer may include a central processing unit (CPU), data storage device, and various amounts of memory including RAM and ROM. Depicted computers may also include various programming, applications, algorithms and software to enable searching, search results, and advertising, such as graphical or banner advertising as well as keyword searching and advertising in a sponsored search context. Many types of advertisements are contemplated, including textual advertisements, rich advertisements, video advertisements, etc.

As depicted, each of the server computers 108 includes one or more CPUs 110 and a data storage device 112. The data storage device 112 includes a database 116 and a Social Aggregation and Substructures Targeting and Communications Program 114.

The Program 114 is intended to broadly include all programming, applications, algorithms, software and other and tools necessary to implement or facilitate methods and systems according to embodiments of the invention. The elements of the Program 114 may exist on a single server computer or be distributed among multiple computers or devices.

Figure 2:
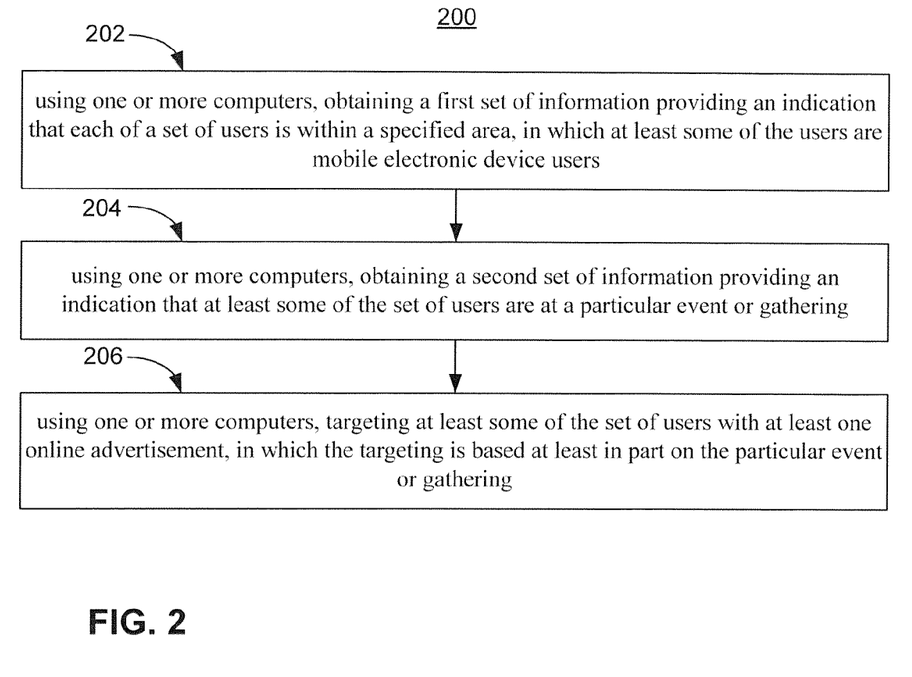
FIG. 2 is a flow diagram illustrating a method according to one embodiment of the invention.

FIG. 2 is a flow diagram illustrating a method 200 according to one embodiment of the invention. At step 202, using one or more computers, a first set of information is obtained, providing an indication that each of a set of users is within a specified area, in which at least some of the users are mobile electronic device users.

At step 204, using one or more computers, a second set of information is obtained, providing an indication that at least some of the set of users are at a particular event or gathering.

At step 206, using one or more computers, at least some of the set of users are targeted with at least one online advertisement, in which the targeting is based at least in part on the particular event or gathering.

Figure 3:
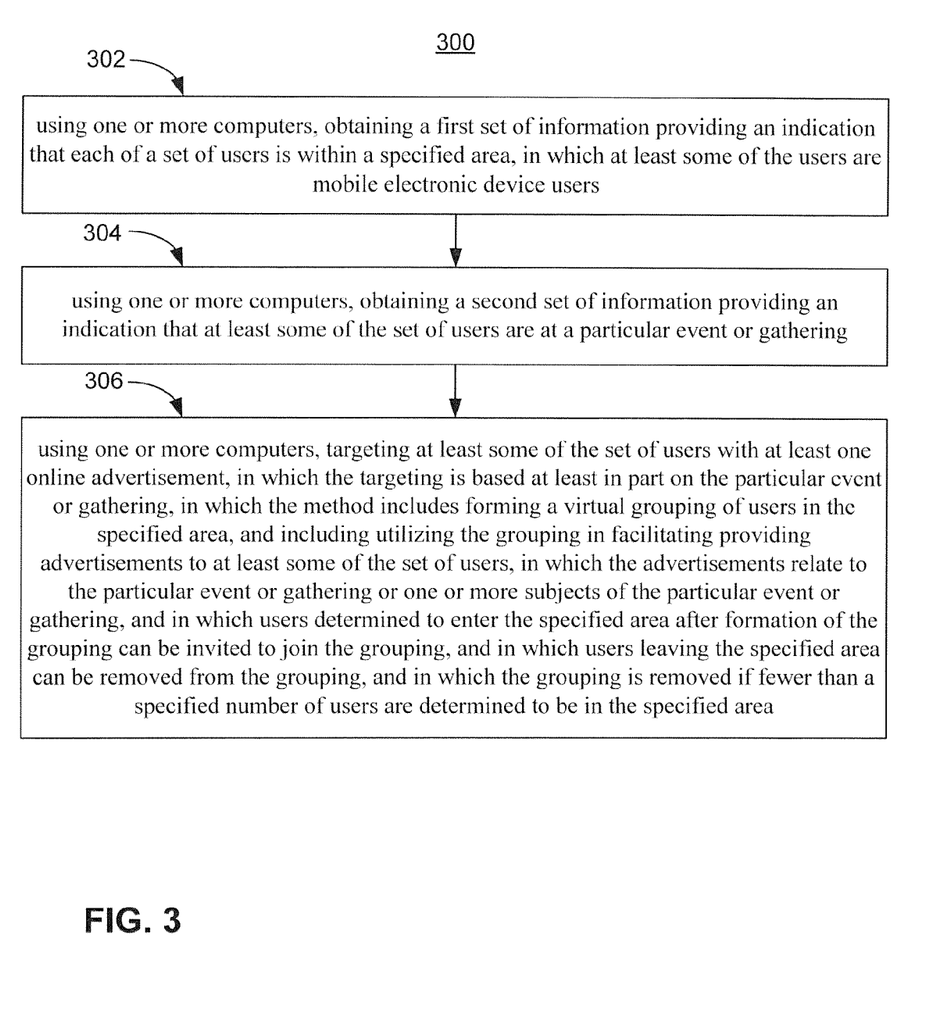
FIG. 3 is a flow diagram illustrating a method according to one embodiment of the invention.

FIG. 3 is a flow diagram illustrating a method 300 according to one embodiment of the invention. Step 302 and 304 are similar to steps 202 and 204 of the method 200 depicted in FIG. 2.

At step 306, using one or more computers, at least some of the set of users are targeted with at least one online advertisement. The targeting is based at least in part on the particular event or gathering. The method 300 includes forming a virtual grouping of users in the specified area. The method 300 further includes utilizing the grouping in facilitating providing advertisements to at least some of the users, in which the advertisements relate to the particular event or gathering or one or more subjects of the particular event or gathering. Users determined to enter the specified area after formation of the grouping can be invited to join the grouping. Users leaving the specified area can be removed from the grouping. The grouping is removed if less than a specified number of users are determined to be in the specified area.

Figure 4:
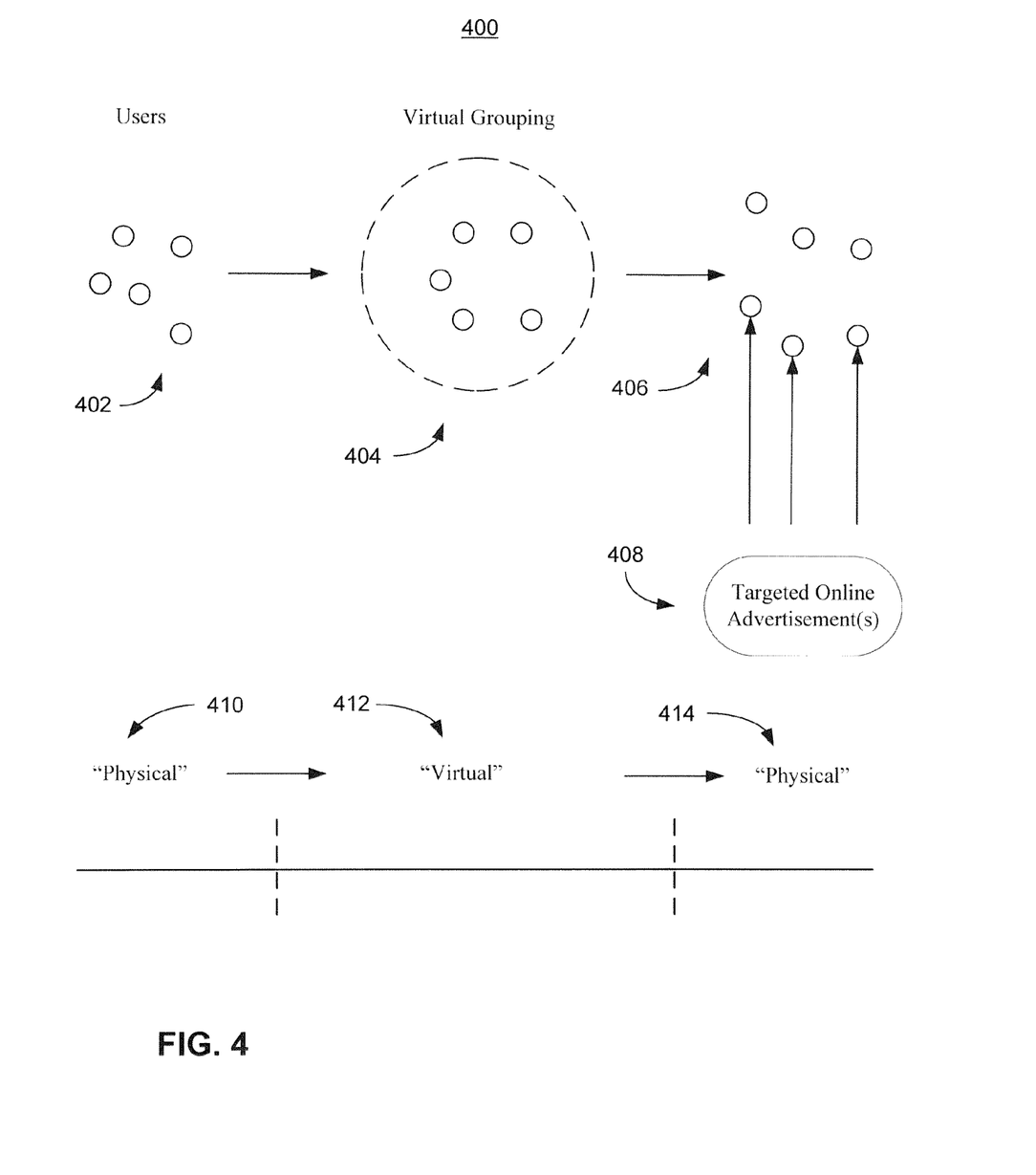
FIG. 4 is a block diagram illustrating one embodiment of the invention.

FIG. 4 is a block diagram 400 illustrating one embodiment of the invention. Block 402 represents users, including mobile electronic device users.

Block 404 represents formation of a virtual grouping of users. In some embodiments, the virtual grouping is formed only if the number of users meets or exceeds a certain specified threshold, or if it is known that there is an event or gathering in or partially in the area in which the users are located. In some embodiments, the virtual grouping reflects the grouping of the users for a particular event or gathering.

Block 408 represents targeting of online advertisements to individual users 406 in the virtual grouping. The virtual grouping may be used to facilitate this, and in some embodiments may also be used to facilitate enabling communications, such as texting, sharing of images, etc., between users of the group. The virtual grouping may change over time, as users enter or leave the specified area, for example. Snapshots in time of users in the grouping may be taken periodically, and users in the grouping may change from snapshot to snapshot, for example.

Conceptually, some embodiments of the invention can be viewed as moving from the "physical" 410, taking into account such things as users' physical location and common interest or experience of a physical event or gathering, to the "virtual" 412, in terms of forming a virtual grouping in association with their common social involvement in the event or gathering, then back to the "physical" 414 in terms of targeting and serving of advertisements or content which may relate to the event or gathering or a subject thereof, or facilitating communications between users, based at least in part on their inclusion in the virtual grouping.

Figure 5:
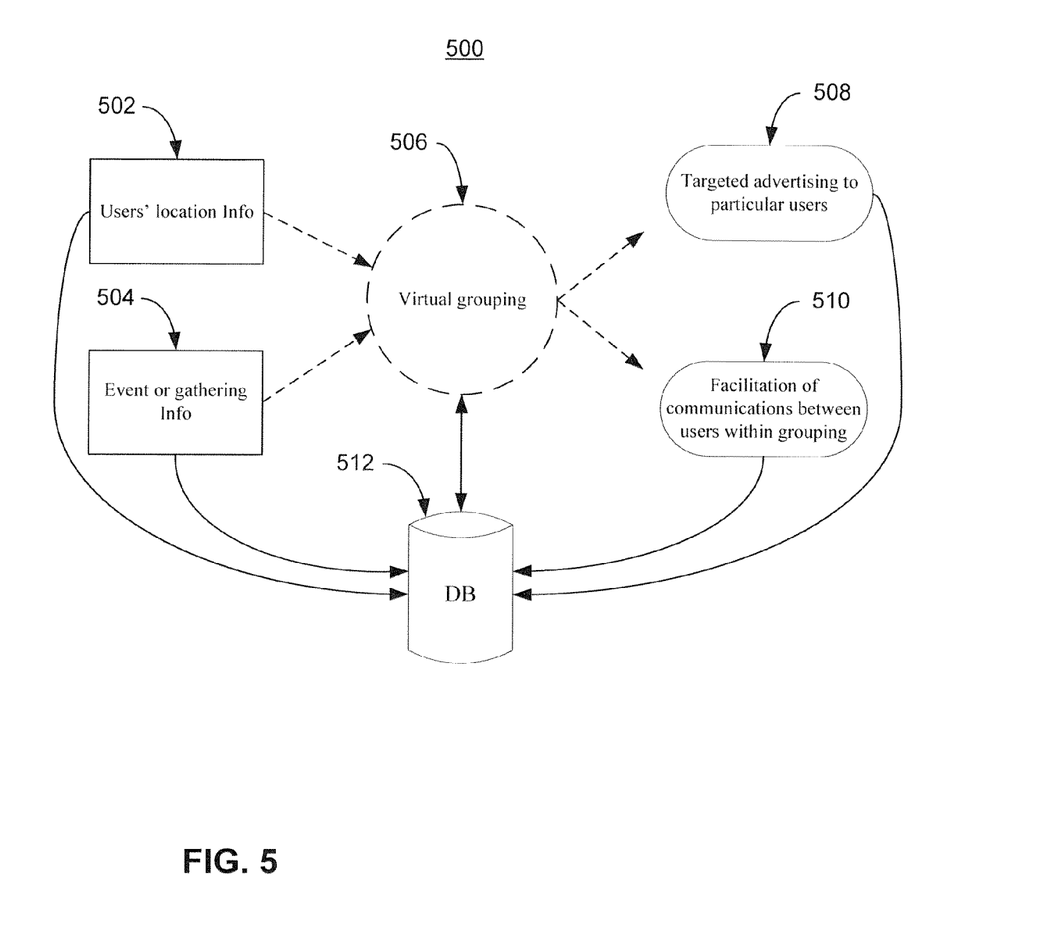
FIG. 5 is a block diagram illustrating one embodiment of the invention.

FIG. 5 is a block diagram 500 illustrating one embodiment of the invention. Blocks 502 and 504 represent information, including users' location information and event or gathering information, respectively. This information 502, 504 is used in generating a dynamic virtual grouping 506 of users. The virtual grouping 506 is used to facilitate targeted online advertising 508 to particular users, which may relate to the event or gathering or a subject thereof The virtual grouping 506 is also used to facilitate communications 510 between users in the virtual grouping 506, such as communications relating to the event or gathering. Various associated information is stored in one or more databases 512.

Figure 5A:
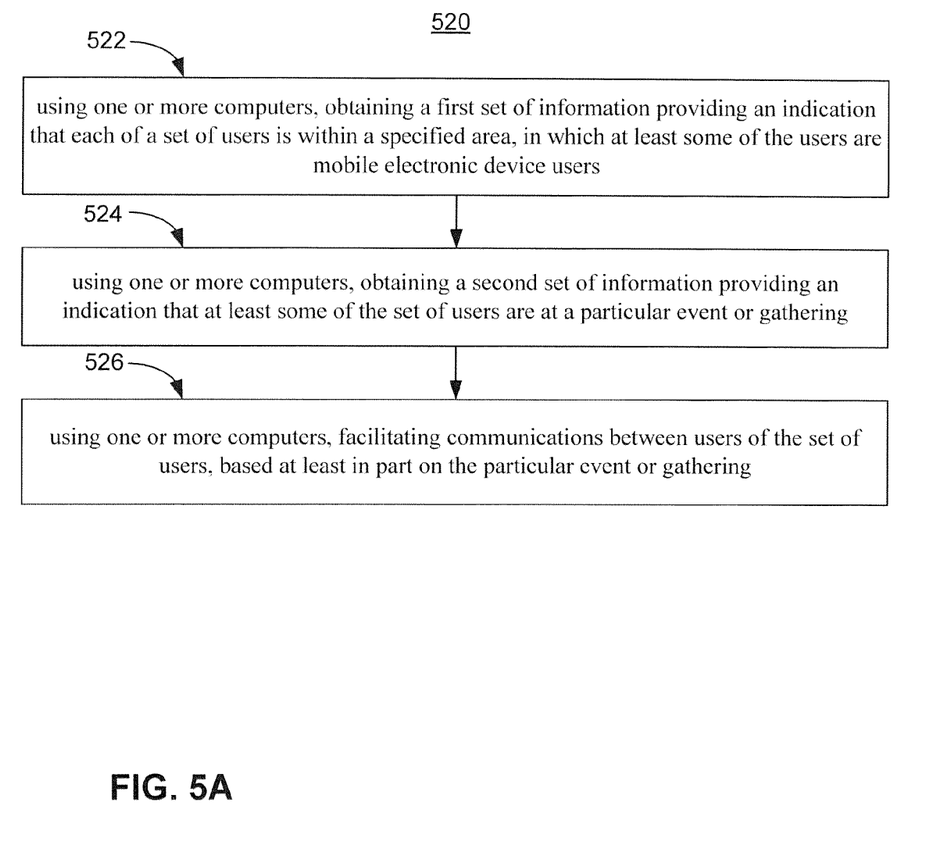
FIG. 5A is a flow diagram illustrating a method according to one embodiment of the invention.

FIG. 5A is a flow diagram illustrating a method 520 according to one embodiment of the invention.

At step 522, using one or more computers, a first set of information is obtained, providing an indication that each of a set of users is within a specified area, in which at least some of the users are mobile electronic device users.

At step 524, using one or more computers, a second set of information is obtained, providing an indication that at least some of the set of users are at a particular event or gathering.

At step 526, using one or more computers, communications are facilitated between users of the set of users, based at least in part on the particular event or gathering.

Figure 5B:
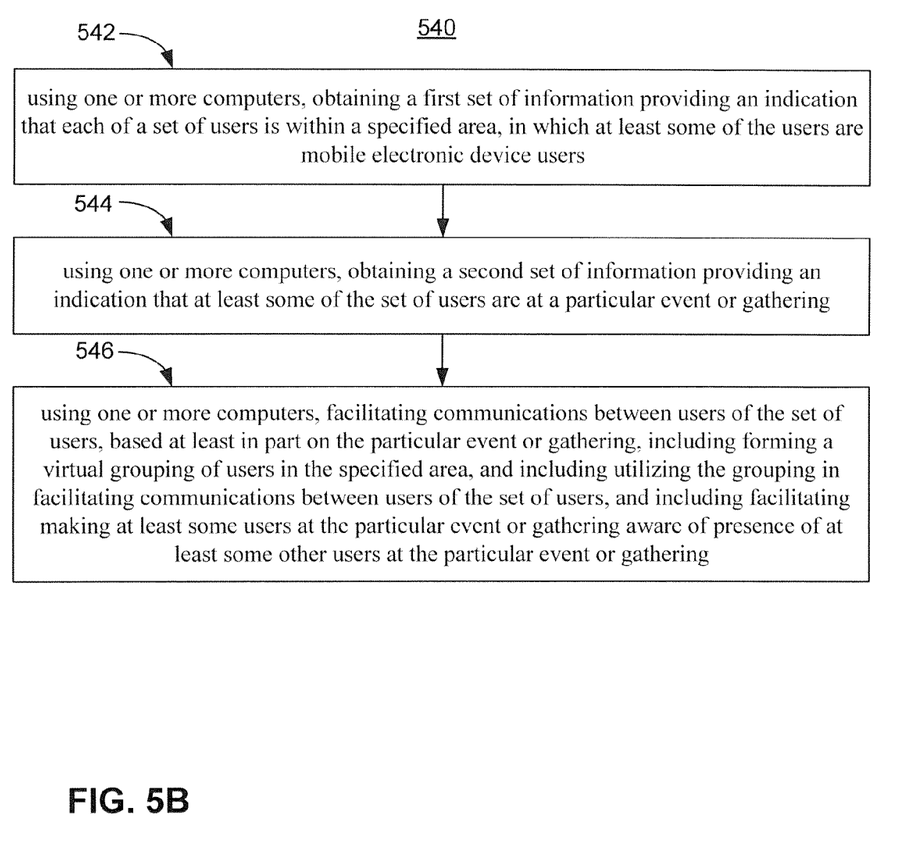
FIG. 5B is a flow diagram illustrating a method according to one embodiment of the invention.

FIG. 5B is a flow diagram illustrating a method 540 according to one embodiment of the invention. Steps 542 and 544 of the method 540 are similar to step 522 and 524 as depicted in FIG. 5A.

At step 546, using one or more computers, facilitating communications between users of the set of users, based at least in part on the particular event or gathering, including forming a virtual grouping of users in the specified area, and including utilizing the grouping in facilitating communications between users of the set of users, and including facilitating making at least some users at the particular event or gathering aware of presence of at least some other users at the particular event or gathering.

Sonic embodiments of the invention provide focused or targeting advertising in connection with a social event or social gathering. Some embodiments include a recognition that human social behavior can be analogized with the social behavior of animals, and concepts relating to social behavior of animals can be useful in recognizing, demonstrating, explaining, characterizing or utilizing analogous behavior in people and groups of people.

For example, "aggregation" is a general term for any collection of fish that have gathered together in some locality. If the aggregation comes and stays together in an interactive, social way, they are said to be shoaling, and those that swim in the same direction in a coordinated manner are said to be schooling. By analogy, people that gather for a social event or gathering can be thought of as schooling. Some embodiments of the invention provide or facilitate a way for people sharing a common experience to be able to share, or automatically and conveniently be able to share, information about the event with each other, and to have relevant targeted advertisement delivered to them.

Some embodiments can be thought of taking the physical location of particular users and their interest in an event into the "virtual" and then back to the "physical" with up to date targeted information and advertising. Some embodiments allow targeting of users in a group, including new users to the group, by using information about the interests of each user. Of course, embodiments of the invention contemplate use of various known forms of targeting, including demographic targeting, behavioral targeting, etc., in addition to or along with targeting according to embodiments of the invention.

Some embodiments include dynamically creating a virtual grouping of users in the same geographical location to allow information exchange and advertising targeting. In some embodiments, the grouping exists only as long as there are users interested in the event and is torn down once the social event concludes. Some embodiments enable a new type of advertiser marketing where grouped users could be served relevant targeted advertisements about the social event they are attending. Interest in the event topic by users who choose to be at the event is naturally high, so advertisers obtain the advantage of a highly interested set of possible customers. Furthermore, some embodiments include allowing or facilitating communications between users at the event, such as sharing of thoughts and tips on the event.

Some embodiments of the invention recognize that users, such as users of mobile devices, often got together at an event, such as a New Year's Eve party, 4th of July celebration, Mardi Gras, a Sporting event, or even the scene of a disaster. However, linking such users, or linking them conveniently, may require that they know one another and are connected, such as through a social networking site, etc. Some embodiments of the invention link or help link such users, and also enable targeted advertising to them that relates in some way to the event.

Some embodiments further recognize that understanding grouping of users at an event can facilitate providing effective and relevant advertisements not only to users initially determined to be at the event, but also to users that will join the group in the future. As such, some embodiments of the invention can be viewed as moving from the specific, as in individual users, to the general, as in recognizing a grouping of users, back to the specific, as in targeting of individual users in connection with the grouping, perhaps including individual users who were not in the initial group.

Returning to the analogy with social behavior of fish, some embodiments can be viewed as including the following steps or elements. Some embodiments can be viewed as initially building up the school of users. This can be viewed as being done by first identifying an aggregate of individuals, then recognizing shoaling if there is an indication that the individuals are aggregated for a single cause, reason, etc., and finally recognizing and promoting schooling by facilitating information exchange and advertisement targeting. Furthermore, new users can be added to the grouping under certain circumstances, and advertisements can be targeted to them accordingly, which can include inference or prediction about their interests based on the grouping, etc. Furthermore, some embodiments utilize machine learning and clustering techniques in various of these steps or elements.

Furthermore, some embodiments include removing a user from the grouping under certain circumstances, such as if the user leaves a specified area or if the user communicates a desire to leave the grouping. Some embodiments also include tearing down, disabling, or removing and informationally "cleaning up" the grouping under certain circumstances, such as if a certain critical mass threshold of number of users is no longer met, or if the event is determined to have concluded.

In some embodiments, users in a grouping can include mobile electronic device users (such as users of cell phones, smart phones, handhelds, etc.) as well as laptop or desktop computer users and other electronic or computerized devices, including devices wirelessly connection to the Internet via any wireless network, for example. Various techniques are known for locating such users, with varying degrees of specificity and certainty, such as login or other personal information, GPS information, IP information, etc., and various embodiments of the invention contemplate usage of any of various location techniques for location of mobile users, desktop users, and other users.

In various embodiments, recognizing users at an event or gathering can be done in different ways and using various algorithms. In some embodiments, users at a location or area are dynamically grouped in accordance with some preset parameters or constants.

For example, in some embodiments, location information associated with mobile devices and stationary computers can be used in determining to form a grouping if a specified threshold of users at the location, or of users of certain types at the location, is reached or exceeded. For example, if there are a specified number of logged-in mobile users logged in and at the same geographical location, this could trigger formation of a grouping. As a further example, if the number of mobile users within a monitored specified distance multiplied by a weighting for average time the distance is greater than a certain specified number, this could trigger formation of a grouping. Of course, many other formulations and algorithms are contemplated.

For example, in some embodiments, when a specified minimum user count is detected within a specified radius, a social grouping is created for up to a maximum specified duration.

In some embodiments, a default radius or area size may be utilized in determining an area to monitor for users. Furthermore, in some embodiments, one of several default radius constants may be used, depending on population density of a location, for example.

In some embodiments, a snapshot frequency may indicate how frequently information regarding users in an area, or active users in an area, is refreshed or checked. If a threshold is reached, a grouping is formed. Furthermore, in some embodiments, once formed, a grouping may be set for a specified maximum duration, which will be the duration of the grouping unless, for example, the number of users falls below the threshold, which may trigger expiration of the grouping prior the maximum duration.

Once a group is formed, each user can be given the option to opt in or out. Furthermore, in some embodiments, users are prompted and asked if they want to form a group. Also, users can have the option to leave the group at any time, or if they leave the location. For users that are included, sharing of messages, images, videos, and other communications and information can be facilitated. Furthermore, targeted advertisements can be served to them.

In some embodiments, once a group is formed, remote users who are not within the area can be allowed to join, if they wish to be part of the gathering remotely.

In some embodiments, groupings can be arranged or requested in advance, or a permanent grouping can be arranged for an area, such as by event planners, event organizers, managers of facilities, etc. Examples could include Disney World, State Fair, etc.

In some embodiments, planners or organizers can specify, select, or have input regarding certain parameters or weighting factors associated with the grouping, such as the type of event, the specific area and how large an area to monitor, or the snapshot frequency, for example. For example, in some embodiments, one of a range of event types can be specified, each of which may be associated with a different weighting factor, which may pertain to any of various weightable parameters. For example, an "emergency" type event can be assigned a high weighting factor for importance or priority, can use both mobile and non-mobile location technology, and could include such events as weather-related crises, hazardous spills, criminal activity, etc. Another type of event, with a lesser weighting, could be a community event, such as a July 4 celebration, etc. Still another type of event with a still lesser weighting could be a random gathering, and could be limited to mobile users only.

Furthermore, different levels of pertinent area size weighting can be utilized, which weighting factor could be used in connection with various weightable parameters. For example, Disney World or Times Square could be assigned a wide or large area weighting. Other area size weightings could include a medium weighting, such as a portion of a mile, and small area size weighting, such as several city blocks, etc.

Similarly, different snapshot frequency categories, levels, or weightings can be utilized, such as, for example, infrequently, such as every four hours or more, intermittent or medium frequency, such as from one to four hour intervals, and frequently, such as less than one hour intervals.

For example, in some embodiments, once a grouping is formed, if a user is detected within a certain radius of a precise location, the user may be prompted to join. Furthermore, in some embodiments, the radius can be determined based in part on weighting factors relating to event type, area size, etc.

In some embodiments, advertisement placement options are made available in connection with a grouping for a social event, in which advertisers can bid on advertisement placement for their advertisement.

In some embodiments, any logged in user (such as logged in with a particular Web portal, service-provider, service-facilitator, content-provider etc.) with a mobile device who is determined to have entered the area of the group is prompted and provided an option for inclusion.

Furthermore, various other users that want to join may be permitted to join the group, which can include remote users.

Also, in some embodiments, Web-based services, such as properties associated with a portal, including email, instant messaging, etc., can be used by a portal or service-provider or facilitator, or by other users, to communicate with users in groups. Such techniques can also be used to communicate with users, or targeted users, who are not in the groups, such as in making availability of a group or groups visible to users who are not presently in the group but who have preferences or interests that may be associated with or similar to a subject or topic associated with the group. Furthermore, using similar techniques, for example, the portal or service-provider could relay event-related information to help attendees more fully enjoy the event, etc., such as, for example, by providing messages like, "Fresh popcorn will be ready at State Fair main tent in 5 minute", or "Fireworks at the Castle start in 5 minutes", etc.

Targeting advertisements of various types could be provided, which may relate in some way to the event. For example, at a school sporting event, an advertisement could be shown to users at the event indicating that school logo embossed T-shirts are available for sale at the main gate, etc.

In some embodiments, various options and configurable parameters are provided to entities including portals, organizers, users, etc.

In some embodiments, various security and privacy measures can be taken, and options can be provided to users. For example, logged in users may be allowed to set their profiles so that they not be prompted to join groups for locations that they may wander into, etc. Also, users that are identified as possible event attendees may need to indicate or confirm that they actually want to join before they are added to the group. Furthermore, in some embodiments, comments or other communications may be shared between users in the group out sharing identification information. Also, age-appropriate filters could be utilized to filter out inappropriate comments from being viewed by young users, etc.

In sonic embodiments, once the number of users in the group is determined to be at or below a certain minimum, the group is disabled or removed, and users who are or were in the group are sent a message informing them that the group has been or is being closed.

In some embodiments, groupings and information can be utilized and incorporated into, for example, Web portal properties like email, instant messaging, and even a homepage. For example, based on location, a user could be provided with a listing of nearby groups and their location and distance from the user. The user could then browse the list, obtain more information, join a group remotely, consider physically going to the event, etc.

Figure 6:
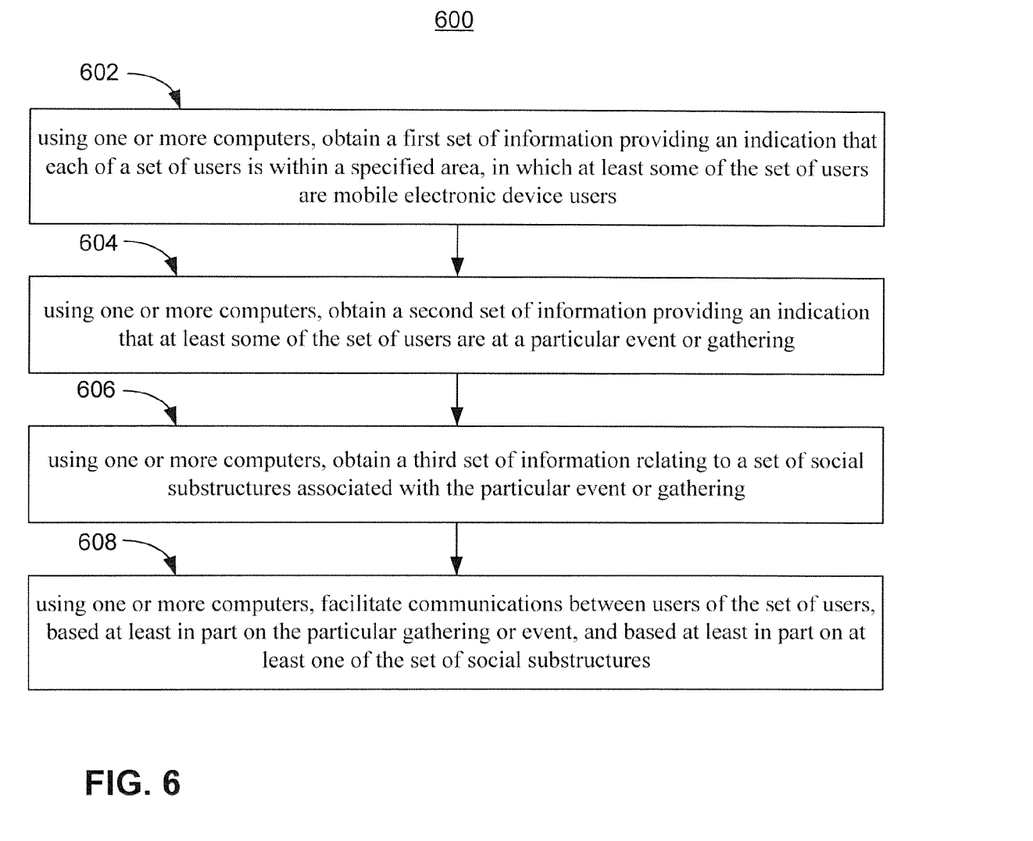
FIG. 6 is a flow diagram illustrating a method according to one embodiment of the invention.

FIG. 6 is a flow diagram illustrating a method 600 according to one embodiment of the invention.

At step 602, using one or more computers, a first set of information is obtained, providing an indication that each of a set of users is within a specified area, in which at least some of the set of users are mobile electronic device users.

At step 604, using one or more computers, a second set of information is obtained, providing an indication that at least some of the set of users are at a particular event or gathering.

At step 606, using one or more computers, a third set of information is obtained, relating to a set of social substructures associated with the particular event or gathering.

At step 608, using one or more computers, communications are facilitated between users of the set of users, based at least in part on the particular event or gathering, and based at least in part on at least one of the set of social substructures.

Figure 7:
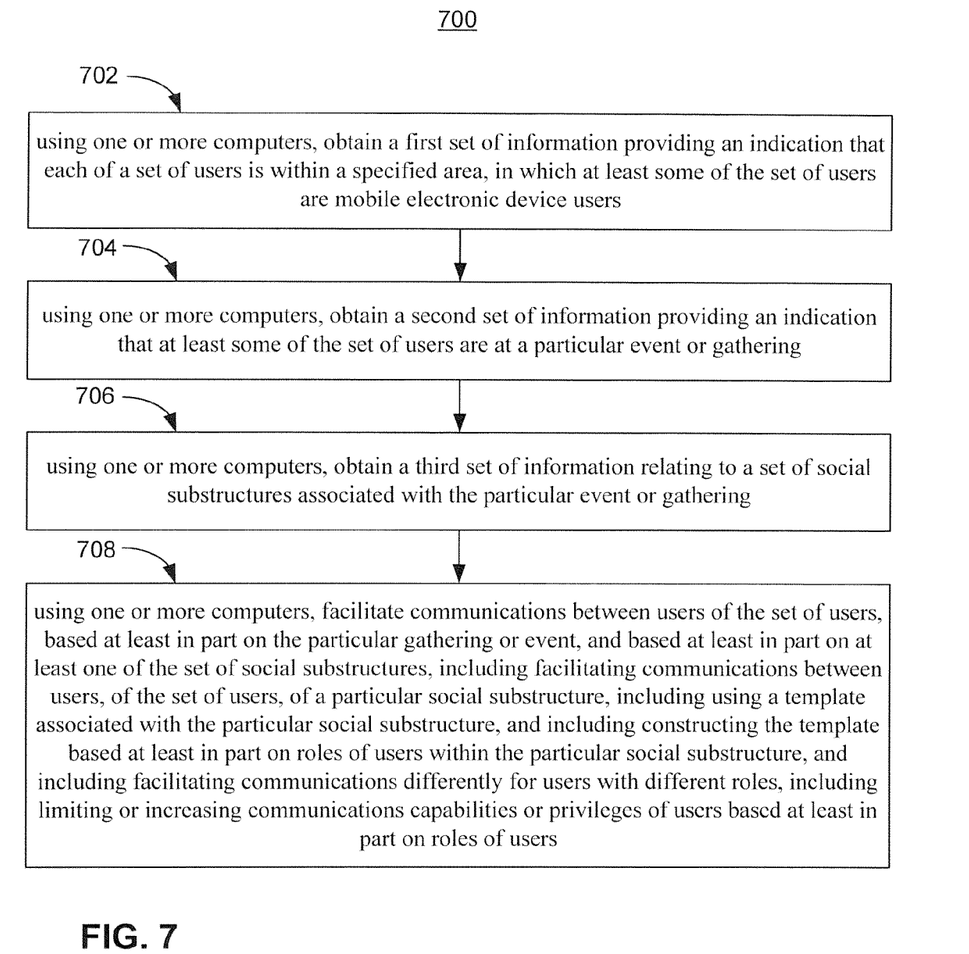
FIG. 7 is a flow diagram illustrating a method according to one embodiment of the invention.

FIG. 7 is a flow diagram illustrating a method 700 according to one embodiment of the invention. Steps 702-706 of the method 700 are similar to steps 602-606 of the method 600 depicted in FIG. 6.

At step 708, using one or more computers, communications are facilitated between users of the set of users, based at least in part on the particular event or gathering, and based at least in part o at least one of the set of social substructures. Facilitating communications between users, of the set of users, of a particular social substructure, includes using a template associated with the particular social substructure. The template is constructed based at least in part on roles of users within the particular social substructure. Communications are facilitated differently for users with different roles, including limiting or increasing communications capabilities or privileges of users based at least in part on roles of users.

Figure 8:
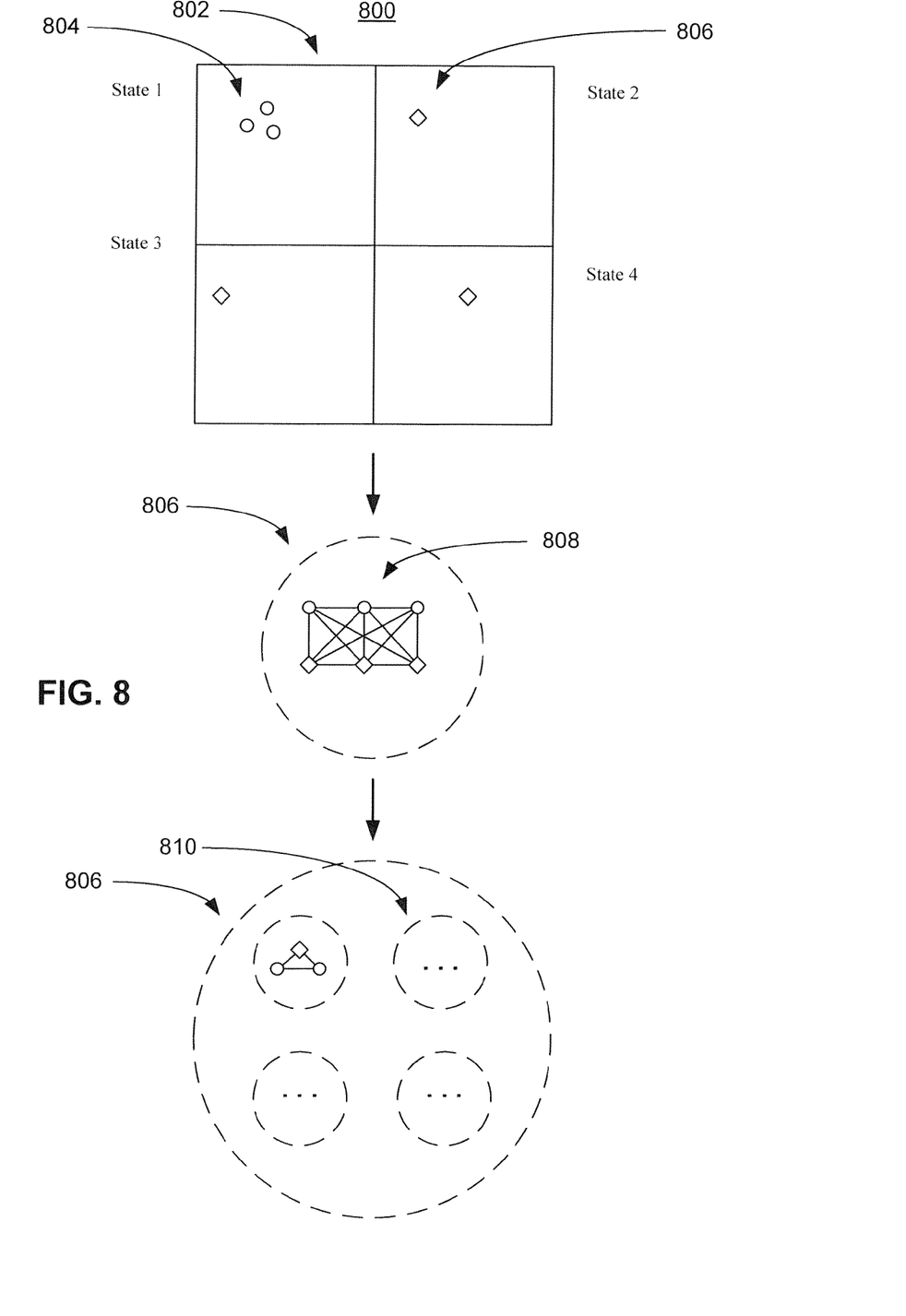
FIG. 8 is a block diagram illustrating one embodiment of the invention.

FIG. 8 is a block diagram 800 illustrating one embodiment of the invention. As described above, some embodiments of the invention include identifying a particular event or gathering. In some embodiments, a gathering of users, such as in a geographic or local area, is identified. Although many or most of the users attending the event or gathering may be local, some may be remote, and may be participating through the Internet, applications, etc. As depicted, numerous local users attending a particular event or gathering are depicted by circles 804 in State 1. Although only three are depicted for illustration, many more than that may be included. Additionally, several remote attendees, here depicted in other states, are represented by diamonds 806.

As mentioned above, some embodiments of the invention can be thought of as going from physical to virtual and then back to physical. As depicted in FIG. 8, the (largely) physical gathering is in a sense virtualized, as represented by broken circle 806. Users that are part of the gathering, whether local or remote, can be thought of as being n the circle 806, as depicted by the represented users 808. In some embodiments, communications may be facilitated between the users 808, as described more fully above. Such communications between users is depicted by lines 808 connecting the users 808 Some embodiments then take things back to the physical, in a sense, by facilitating communications, targeted advertising, etc, as described more fully above.

Furthermore, in some embodiments, it is recognized that, at many gatherings or events, there are subsets of users, or subgroups, that may be considered within the event or gathering, each of which may have different parameters or characteristics. These may be referred to as social substructures, as depicted by smaller broken circles 810. In some embodiments, communications may be facilitated separately or partially separately for particular substructures. Recognizing social substructures, including users included, and associated characteristics, can in some embodiments allow improved, more sophisticated, more effective, or more granular communications facilitation and advertising. Additionally, in some embodiments, roles of different users or sets of users within the gathering, as well as within individual social substructures, may be identified. Once roles are assigned, communications and advertising may in some embodiments be accomplished even more effectively. In some embodiments, for example, communications may be facilitated differently depending on a user's role, such as by allowing additional types of communications or communications-related options for some users, and limiting those of other users.

In some embodiments, templates may be utilized in characterizing and managing particular types of events or gatherings, particular social substructures, and particular user roles. For example, a template may reflect characteristics of social substructures, and guide effective facilitation of communication or advertising. For example, a template may guide differences in communication options or abilities provided to users with difference roles within a social substructure. Furthermore, use and application of definitions and templates in connection with gatherings or events, and social substructures, may be used in obtaining feedback that can then be used in refining groupings and templates, for example, leading to improved functions for future event and gatherings, as well as associated social substructures.

Figure 9:
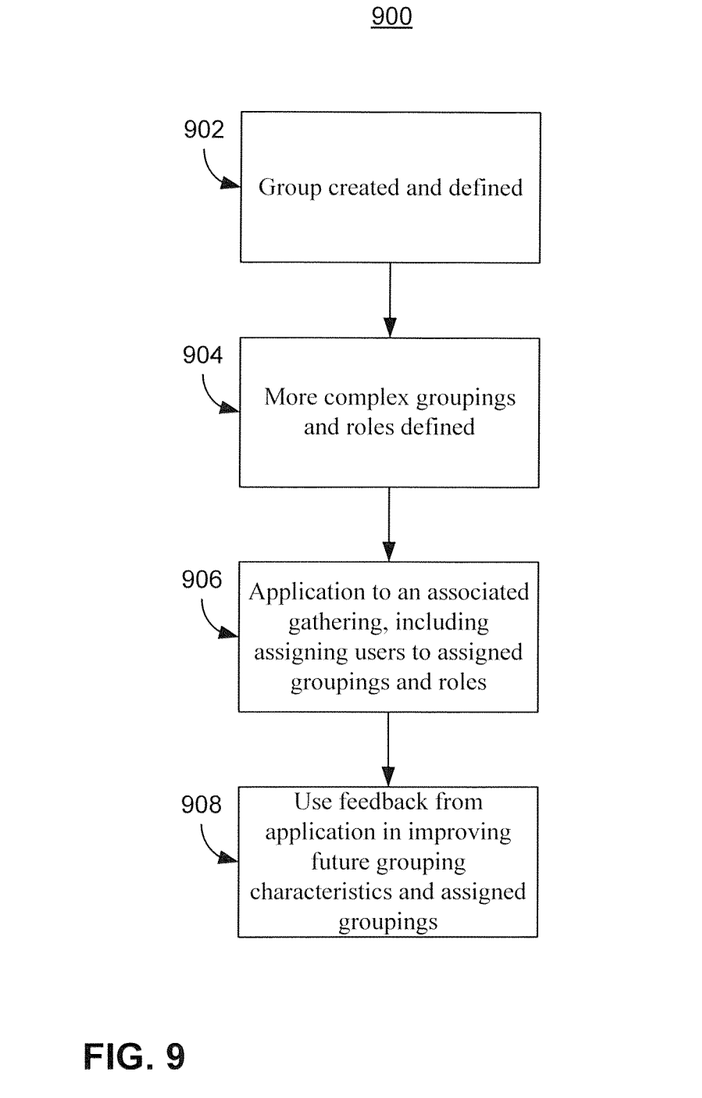
FIG. 9 is a flow diagram illustrating a method according to one embodiment of the invention.

FIG. 9 is a flow diagram illustrating a method 900 according to one embodiment of the invention. At step 902, a group is defined or created, which may correspond to an event or gathering, or a type of event or gathering, for example.

At step 904, associated more complex groupings and roles are defined.

At step 906, defined more complex grouping and roles are applied, such as with the use of assigned groupings, including assigning users to more complex groupings and roles. For example, roles may be determined by utilizing user profiles, user histories including online behavior, or both, as well as other information.

At step 908, feedback from application of groupings, assigned groupings, role definitions and characteristics, etc., in connection with one or more events or gatherings, is collected and utilized in modifying or improving future grouping characteristics and assigned grouping characteristics, and improving overall handling of event or gathering communications and targeting.

Some embodiments of the invention facilitate communications and advertising to users who are part of an event or gathering which may relate to a common topic or theme. However, associated with the overall event or gathering, there can be numerous social substructures, which may relate to groupings within the main gathering, social or demographic subgroups, subtopics or subthemes, etc. Facilitating communications between all or any users in the event or gathering may be very useful, yet further facilitating communications between users of particular social substructures may lead to further advantages. For example, numerous subconversations within an overall grouping can become chaotic and degrade the experience for members of particular social substructures and even for members of the gathering as a whole. By facilitating communications between users of particular social substructures, for example, by forming groups associated with substructures, and roles for users or types of users, and in some cases by assigning or limiting communication privileges and abilities accordingly, communications may be better and more granularly facilitated for the gathering as well as social substructures.

In some embodiments, a particular event or gathering can be viewed as a shape such as a circle or a sphere, with social substructures representing virtual structures which may be within the overall shape. As such, by analogy, some embodiments can be viewed as forming a virtual village, defined in its own right, but having structures within that, even while relating to the hole, have their own unique characteristics and occupants. As another analogy, the event or gathering can be viewed as a cell, with social substructures being like organelles within the cell. In some ways, some embodiments of the invention can be viewed as taking the general to the more specific in identifying and treating social substructures differently than the overall grouping, then optimizing communications at the specific level. Some embodiments can further be viewed as then taking the specific back to the general, since optimizing lines of communication as the specific levels enhances the experience and communications even at the general level. Still further, feedback from communications and functions at the general and specific level can be collected and use to enhance future communications, as ell as advertising.

Social substructures can be diverse and vary between different gatherings or events. For example, at a concert event, social substructures may include members of the band, members of the audience, vendors, die-hard fans, edge-hangers, etc. Furthermore, social substructures could be in whole or in part defined by other factors such as demographics or other user characteristics. For example, families versus singles, adults versus children, etc. Facilitating communications within a social substructure could include, for example, facilitating communications between band members, between sponsors, or between vendors selling items relating to the event, etc.

As mentioned above, feedback, such as from application of templates, can be used to adjust or improve templates for future use. For example, at a sporting event, a template may provide a tram lead role, for a user or users, for each team. The team lead user may be allowed to create fan subgroups. In a particular application, the team lead may create a subgroup for die-hard fans and one or moderate fans. If feedback from use of these new subgroups is positive, then they may be incorporated into future templates. The system may then store the new version of the template for use at future similar events.

As mentioned above, some embodiments include using templates, such as for providing framework for group and subgroup communications. Templates can also define and set characteristics for roles of users and distribution of roles within a grouping or subgrouping. Furthermore, some embodiments include a learning aspect or mode, through which feedback, such as from use and application of templates, is collected and used in creating new or improved templates, roles defined in templates, etc.

Social substructures may be defined based on many factors, including the type of event or gathering. For example, at a sporting event, social substructures may include a social substructure for Team A or fans of Team A, Team B or fans of Team B, etc. As another example, at an event such as a fair, sensible or useful social substructures may include families and non-families. At various types of events, social substructures based or partly based on other user characteristics may also make sense, such as, for example, age category-based social substructures, etc. Templates can be used to define additional substructures when needed or appropriate, analogous in some ways to dividing of a cell or organelles within a cell, for example.

Just as, for example, members of a band, such as vocalist, guitarist, drummer, etc., or sections of an orchestra, have different functions, abilities, privileges and limitations, which can be based on their unique talents and characteristics, so can roles be assigned to users and groups of users within a social substructure. Such roles can be used in appropriately facilitating, allowing or limiting communications or communications-related abilities or privileges, for instance. Roles can be assigned to users based on many different factors, including physical location, user profiles, user online behavior and histories, feedback from other users in the grouping, a point system factoring in a combination of factors or weighted factors, etc. Templates can be used in defining and assigning roles, and also in division of powers, privileges or limitations, which can be based or based in part on roles. As an example, users with a certain role or roles, such as a leader role, may be able to invite users outside the group to join the group, etc.

While the invention is described with reference to the above drawings, the drawings are intended to be illustrative, and the invention contemplates other embodiments within the spirit of the invention.

The invention claimed is:

1. A method comprising:
using one or more computers, obtaining a first set of information providing an indication that each of a set of users is within a specified area, wherein at least some of the set of users are mobile electronic device users;
using one or more computers, obtaining a second set of information providing an indication that at least some of the set of users are at a particular event or gathering;
using one or more computers, facilitating communications between users of the set of users, based at least in part on the particular event or gathering; and
using one or more computers, forming a virtual grouping of users in the specified area, and utilizing the grouping in facilitating text or chat communications between mobile devices of at least some of the set of users and utilizing the grouping in facilitating providing advertisements to at least some of the set of users, wherein users determined to enter the specified area after formation of the grouping can be invited to join the grouping, and wherein users leaving the specified area can be removed from the grouping, and wherein the grouping is removed if fewer than a specified number of users are determined to be in the specified area.

2. The method of claim 1, comprising forming a virtual grouping of users in the specified area, and comprising utilizing the grouping in facilitating communications between users of the set of users, wherein at least some of the communications are related to the particular event or gathering.

3. The method of claim 1, comprising forming a virtual grouping of users in the specified area, and comprising utilizing the grouping in facilitating communications between users of the set of users, comprising making at least some users at the gathering or event aware of presence of at least some other users at the gathering or event.

4. The method of claim 1, comprising targeting at least some of the set of users with at least one online advertisement, wherein the targeting is based at least in part on the particular event or gathering.

5. The method of claim 1, wherein obtaining the first set of information comprises utilizing information relating to locations of the mobile electronic devices.

6. The method of claim 1, wherein obtaining the first set of information comprises utilizing information relating to locations of the mobile electronic devices and information relating to locations of desktop computers.

7. The method of claim 1, comprising forming a virtual grouping of users in the specified area, wherein the grouping remains during a period of time during which one or more threshold parameters appear to be satisfied, and wherein at least one of threshold parameters specifies a minimum number of users being in the specified area.

8. The method of claim 1, comprising forming a virtual grouping of users in the specified area, wherein the grouping remains during a period of time during which one or more threshold parameters appear to be satisfied, and wherein at least one of threshold parameters specifies a minimum number of users being in the specified area, and wherein parameter information, including number of users in the specified area, is obtained at periodic intervals.

9. The method of claim 1, wherein obtaining the second set of information comprises obtaining information relating to time and duration of stay, of at least some of the set of users within the specified area.

10. The method of claim 1, wherein obtaining the second set of information comprises obtaining information relating to time and duration of stay, of at least some of the set of users within the specified area reaching or exceeding a specified threshold.

11. The method of claim 1, wherein obtaining the second set of information comprises obtaining information relating to time and duration of stay of at least some of the set of users within the specified area reaching or exceeding a specified threshold, and wherein at least one parameter of the threshold is associated with population density associated with a region including the specified area.

12. The method of claim 1, wherein obtaining the second set of information comprises obtaining information regarding an event or gathering occurring at least partially within the specified area.

13. The method of claim 1, wherein obtaining the second set of information comprises obtaining information regarding an event or gathering occurring at least partially within the specified area, and wherein information regarding the particular event or gathering is provided by an event or gathering planner.

14. A system comprising:
one or more server computers coupled to a network; and
one or more databases coupled to the one or more server computers;
wherein the one or more server computers are for:
obtaining a first set of information providing an indication that each of a set of users is within a specified area, wherein at least some of the set of users are mobile electronic device users;
obtaining a second set of information providing an indication that at least some of the set of users are at a particular event or gathering;
facilitating communications between users of the set of users, based at least in part on the particular event or gathering;

forming a virtual grouping of users in the specified area, and utilizing the grouping in facilitating text or chat communications between mobile devices of at least some of the set of users and utilizing the grouping in facilitating providing advertisements to at least some of the set of users, wherein users determined to enter the specified area after formation of the grouping can be invited to join the grouping, and wherein users leaving the specified area can be removed from the grouping, and wherein the grouping is removed if fewer than a specified number of users are determined to be in the specified area.

15. The system of claim 14, comprising forming a virtual grouping of users in the specified area, and comprising utilizing the grouping in facilitating communications between users of the set of users, wherein at least some of the communications are related to the particular event or gathering.

16. A non-transitory computer readable medium or media containing instructions for executing a method comprising:

using one or more computers, obtaining a first set of information providing an indication that each of a set of users is within a specified area, wherein at least some of the set of users are mobile electronic device users;

using one or more computers, obtaining a second set of information providing an indication that at least some of the set of users are at a particular event or gathering;

using one or more computers, facilitating communications between users of the set of users, based at least in part on the particular event or gathering;

using one or more computers, forming a virtual grouping of users in the specified area, and utilizing the grouping in facilitating text or chat communications between mobile devices of at least some of the set of users and utilizing the grouping in facilitating providing advertisements to at least some of the set of users, wherein users determined to enter the specified area after formation of the grouping can be invited to join the grouping, and wherein users leaving the specified area can be removed from the grouping, and wherein the grouping is removed if fewer than a specified number of users are determined to be in the specified area; and using one or more computers, utilizing the grouping in facilitating making at least some users at the particular event or gathering aware of presence of at least some other users at the particular event or gathering.

* * * * *